(No Model.) 2 Sheets—Sheet 1.

E. WESTON.
SYSTEM OF GENERATING AND REGULATING ELECTRIC CURRENTS.

No. 289,324. Patented Nov. 27, 1883.

Attest:
Raymond F. Barnes.
W. H. Doggett.

Inventor:
Edward Weston
By Parker W. Page, atty

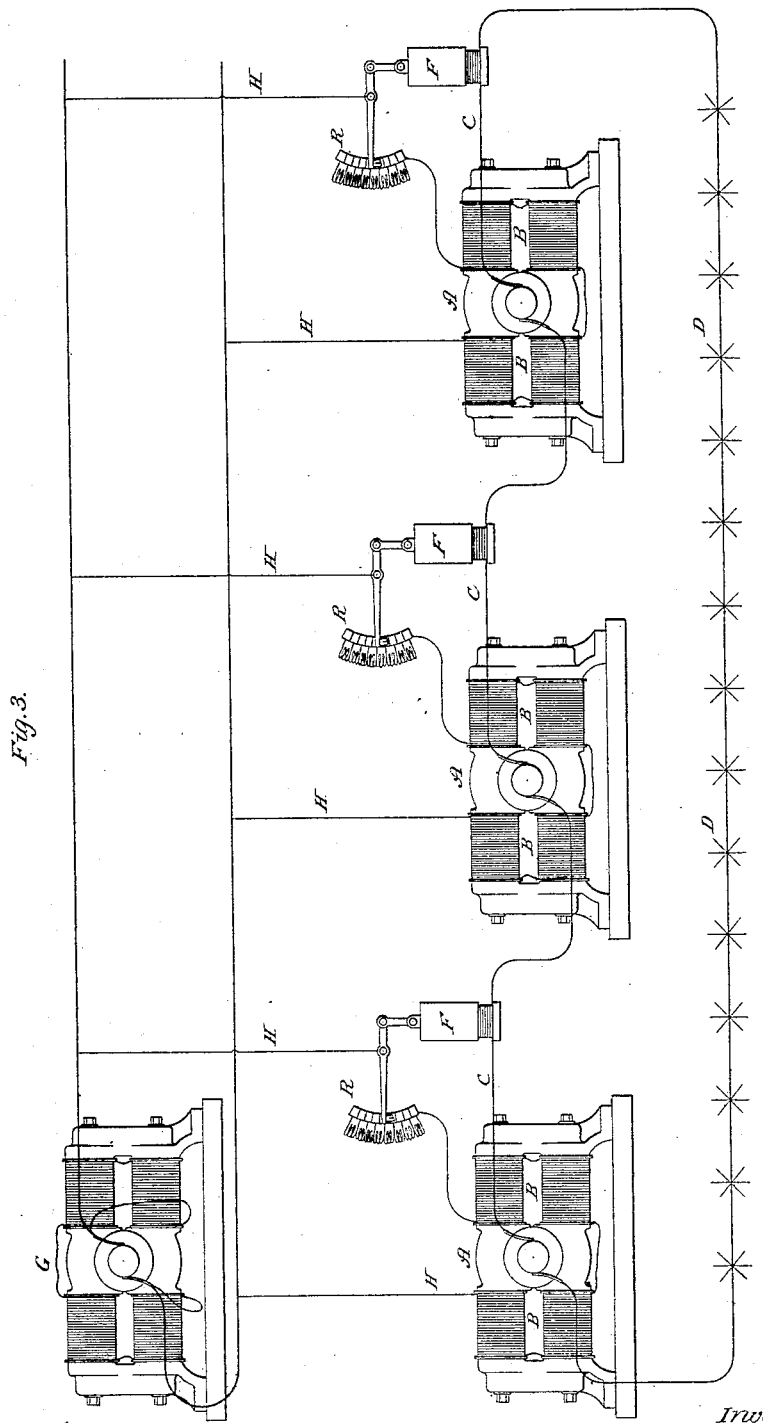

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

SYSTEM OF GENERATING AND REGULATING ELECTRIC CURRENTS.

SPECIFICATION forming part of Letters Patent No. 289,824, dated November 27, 1883.

Application filed July 16, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Systems of Generating and Regulating Electric Currents, of which the following is a specification, reference being had to the drawings accompanying and forming a part of the same.

When two or more dynamo or magneto machines are run in series for producing a current suited to such purposes as arc lighting, it is desirable to have some means of regulation that will maintain a constant flow of current without waste of power. I have invented a system of regulation for accomplishing this, which I have illustrated in a former patent, the same consisting in exciting the field of a machine by a derived circuit from the main conductors; or, in case of two or more machines being used, exciting their fields by including them in series in a derived circuit to all the armatures, and controlling the amount of current flowing in the field-circuit through the instrumentality of an electro-magnet in the main or armature circuit, and in series with the lamps or other devices included in that circuit. When several machines of considerable capacity are run in series for supplying the current in a given circuit, the range of regulation necessary or likely to be used is so great that this plan involves certain objections. For instance, the number of resistance-coils necessary for the field-circuit becomes very great, and, again, it is difficult to discontinue the use of one machine of the series without interfering with the action of the others. In view of this I have devised the novel plan for regulating a battery of machines whose armatures are connected in series which consists in exciting the field of each machine by a separate circuit or branch circuit and controlling the amount of current flowing in the circuits by means of electro-magnets in the main circuit. The details of this system will be illustrated by means of the accompanying drawings, in which—

Figure 1:
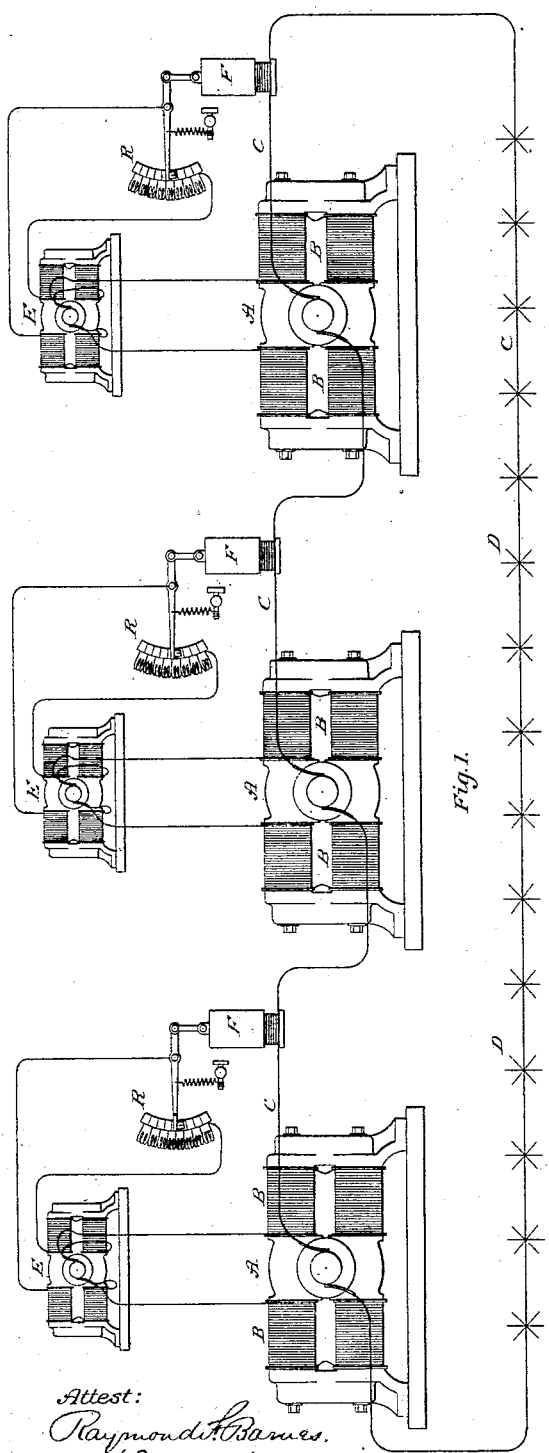
Figure 2:
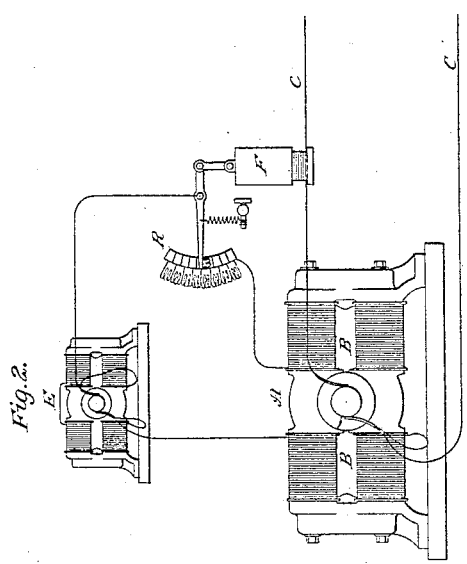

Figure 1 is a diagram illustrating the general plan of regulation; Fig. 2, a diagram of a portion of the system with modifications. Fig. 3 is a diagram similar to that in Fig. 1, but illustrating a different way of exciting the fields of the machines.

Similar letters of reference indicate corresponding parts in the several figures.

Letters A A designate generators; B B, their field-magnets; C C, a circuit with which their armatures are connected, and D D an arbitrary number of arc-lamps or other devices run in series by the current developed in the machines.

The field-magnets of the generators, referring now to Fig. 1, are energized by small machines E E, the field-circuits being independent of each other and of the armature or main circuit. The field of each of the small machines or exciters E is derived from its own armature-circuit, and contains a variable resistance, R, that is operated or controlled by an electro-magnet, F, in the main circuit C. There is in this arrangement, therefore, an exciter, E, for each generator A, a variable resistance in the field-circuit of each exciter, and a controlling-magnet, F, for each resistance included in the main circuit of the generators.

The character of the resistance devices may be greatly varied, and no special means is required. I prefer, however, to use for this purpose the devices shown and described in my Patent No. 278,640, May 29, 1883. By employing a number of resistances, one for each machine, in this manner, great saving in expense is effected and a better regulation secured.

It will be observed that the action of the magnets F is to insert a greater resistance in the field-circuit of the exciters when too great a current flows in the main circuit C, so that the currents energizing the fields of the generators A are reduced, and conversely, so that the current is in this manner maintained constant. It being only necessary to vary the current strength of each of the field-circuits of the generators A, other means may be adopted for accomplishing the result. For example, in lieu of varying the resistance of the derived field-circuits of the exciters, as in Fig. 1, the resistances R may be included in the armature-circuits of the exciters, which are in Fig. 2 the field-circuits of the generators A; or, instead of using a separate exciter for each generator, a single exciter, G, may be used for all, and the fields included in branch or multiple-arc circuits H, as shown in Fig. 3. In this case the amount of current flowing through each generator field-circuit is determined by a similar arrangement of resistances, R, and controlling-magnets F to that illustrated in Fig. 1. In general, therefore, the objects of the invention are attained by using separate circuits or branches of the same circuit for energizing the fields of the generators and controlling the current flowing in said circuits by electro-magnets included in the main or armature circuit of the generators.

Without, therefore, limiting myself to the specific means herein shown or described for carrying out the invention, and without relinquishing the right to claim in other applications features of novelty involved in this system, but not specifically nor distinctly claimed herein, what I now claim is—

1. The method herein described of regulating a group or battery of electrical generators connected in series, which consists in exciting or energizing the field-magnets of each generator by an independent circuit or branch circuit and varying the current flowing in the said circuits in accord with variations in the circuit of the generators, substantially as set forth.

2. The combination, with a group or battery of electrical generators connected together in series, of independent or separate field-circuits, electro-magnets in the main circuit of the generators, and means operated thereby for controlling the current in the field-circuits, substantially as set forth.

3. The combination, with a group or battery of electrical generators connected together in series, of independent or separate field-circuits, variable resistances included in said circuits, and electro-magnets included in the main circuit of the generators, for operating or varying the resistances in the field-circuits.

4. The combination, with a group or battery of electrical generators connected together in series, of independent field-circuits and exciters, one for each generator, and electro-magnets for controlling or varying the current of the exciters, as and for the purpose specified.

5. The combination, with a group or battery of electrical generators connected together in series, of independent field-circuits and exciters, the latter having derived field-circuits, variable resistances included in the field-circuits of the exciters, and electro-magnets in the main circuit of the generators for varying or controlling the resistance in the field-circuits of the exciters, as and for the purpose specified.

6. The combination, with a group or battery of independently-energized electrical generators connected together in series, of independent means for regulating or controlling the current of each generator operated or controlled by the current from all the generators, in the manner specified.

In testimony whereof I have hereunto set my hand this 14th day of July, 1883.

EDWARD WESTON.

Witnesses:
HENRY A. BECKMEYER,
L. V. E. INNES.